United States Patent [19]

Asano et al.

[11] Patent Number: 4,895,882

[45] Date of Patent: Jan. 23, 1990

[54] FRICTION MATERIAL COMPOSITE

[75] Inventors: Hiroshi Asano; Kouichi Iwata, both of Hyogo, Japan

[73] Assignees: Nippondenso Co., Ltd., Kariya; Sumitomo Electric Industries, Ltd., Osaka, both of Japan

[21] Appl. No.: 128,405

[22] Filed: Dec. 2, 1987

[30] Foreign Application Priority Data

Dec. 4, 1986 [JP] Japan ............................ 62-289590
Jul. 6, 1987 [JP] Japan ............................ 62-168488

[51] Int. Cl.$^4$ .......................... C08J 5/14; B22C 11/22
[52] U.S. Cl. .................................. 523/145; 523/152; 523/155; 523/157
[58] Field of Search ............... 523/145, 152, 155, 157

[56] References Cited

U.S. PATENT DOCUMENTS

| | | | |
|---|---|---|---|
| 4,119,591 | 10/1978 | Aldrich . | |
| 4,656,203 | 4/1987 | Parker | 523/152 |
| 4,663,368 | 5/1987 | Harding et al. | 523/152 |
| 4,722,949 | 2/1988 | Horiguchi et al. | 523/155 |
| 4,735,975 | 4/1988 | Iwata | 523/152 |

FOREIGN PATENT DOCUMENTS 2000793 1/1979 United Kingdom .
2163784 3/1986 United Kingdom .

*Primary Examiner*—George F. Lesmes
*Assistant Examiner*—D. R. Zirker
*Attorney, Agent, or Firm*—W. G. Fasse; D. H. Kane, Jr.

[57] ABSTRACT

A friction material composite especially suitable for an electromagnetic clutch, includes a reinforcing fiber material, optionally an organic filler, an inorganic filler, and a friction and abrasion conditioner bonded together by a thermosetting resin binder. The reinforcing fiber material contains 25 to 35 percent by volume of staple cellulose pulp of not more than 150 $\mu$m in fiber length. The organic filler contains 30 to 40 percent by weight of an organic filler material of not more than 840 $\mu$m in maximum grain size. The friction and abrasion conditioner contains and 0.5 to 5 percent by volume of aluminum oxide and/or magnesium oxide of not more than 250 $\mu$m in maximum grain size. The material composite has a porosity in the range of 15 to 30 percent by volume.

7 Claims, 3 Drawing Sheets

FRICTION MATERIAL COMPOSITE

FIELD OF THE INVENTION

The present invention relates to a composite for a friction member such as a brake lining or a clutch facing applied to a torque transmission member such as an electromagnetic clutch.

BACKGROUND INFORMATION

In general, a friction material for a brake lining or a clutch facing which is applied to a torque transmission member such as an electromagnetic clutch, is prepared by adding a binder of thermosetting resin such as phenol resin to asbestos fiber, inorganic and organic fillers and an organic friction conditioner etc., performing a hot press forming of the mixture and then hardening the same. However, the public nuisance of asbestos dust has been recognized. As a result, a friction material not containing any asbestos fibers, is required not only for mobile applications but also for electromagnetic clutches for driving a business machine and an industrial machine.

The asbestos fibers are replaced by metallic fibers, glass fibers, ceramic fibers, synthetic fibers or the like, and a friction member made of steel fibers, known as a so-called semi-metallic pad, has been put into practice for mobile applications.

However, a semi-metallic pad made of steel fibers, is not applied in a friction member for an electromagnetic clutch, which must be made of a nonmagnetic substance. Further, although a friction material prepared of glass fibers has been used in a clutch plate in practice, such a material will not be of great utility in the future, since the raw material therefor is expensive and additionally inferior in its workability and handling.

Aramid fibers, which have recently being considered with interest, have been practically employed for making a friction member for mobile applications. However, wide spread use of aramid fibers is not expected because of the high cost, similar to the friction material made of glass fibers.

Thus, awaited is development of a non-asbestos friction material, which can be made of low-priced raw materials.

SUMMARY OF THE INVENTION

The inventors have already developed a friction material which in performance is equivalent to or better than a conventional non-asbestos friction material based on aramid fibers. See Japanese Patent Laying-Open Gazette Nos. 261387/1986, 13479/1987 and 15281/1987 and U.S. Pat. No. 4,735,975.

However, a friction member applied to an electromagnetic clutch, e.g. in a business machine, must have an excellent torque transmission ability even in an unused state, which differs from the requirements to be met by a friction member for mobile applications. The present friction member must satisfy the condition of $\mu \geq 0.4$ converted to a friction coefficient. The aforementioned non-asbestos friction material developed by the inventors has not satisfied the above condition in simulation evaluation tests applying said materials in to an actual electromagnetic clutch. Further, in said non-asbestos friction material the mixed powder is in a flocculated state prior to molding, hereinafter referred to as mixed powder, which complicates the steps of manufacturing a homogenous product in the form of a ring-shaped friction plate such as an electromagnetic clutch, whereby the manufacturing cost is increased.

Accordingly it is, an object of the present invention to provide a friction material composite, which is equivalent in its friction characteristic, to a conventional non-asbestos friction material based on aramid fibers, while having a friction coefficient in an initial state thereof, which is in excess of its friction coefficient in a later stable state.

The present invention provides a friction material composite which comprises a reinforcing fiber material, an organic filler, an inorganic filler and a friction/abrasion conditioner which are bonded by a thermosetting resin binder. This composite contains 25 to 35 percent by volume of staple cellulose pulp of not more than 150 $\mu$m in fiber length as the reinforcing fiber material, 30 to 40 percent by volume of an organic filler of not more than 840 $\mu$m in maximum grain size and 0.5 to 5 percent by volume of aluminum oxide and/or magnesium oxide of not more than 250 $\mu$m in maximum grain size as the friction/abrasion conditioner, said composite material having a porosity of 15 to 30 percent by volume.

DETAILED DESCRIPTION OF THE INVENTION

The friction material composite according to the invention contains 25 to 35 percent by volume of staple cellulose pulp as the reinforcing fiber material since, on the one hand, the object of the present invention cannot be attained if the content of the staple cellulose pulp is smaller than 25 percent by volume because strength of a friction plate is lowered and its abrasion resistance becomes unacceptable. On the other hand, the friction coefficient becomes unstable if the reinforcing material is in excess of 35 percent by volume.

According to the present invention, the friction/abrasion conditioner is made of aluminum oxide and/or magnesium oxide. Either material may be independently employed, while such materials may also be combined with each other. The content of aluminum oxide and/or magnesium oxide is 0.5 to 5 percent by volume. If the content is less than 0.5 percent by volume, the friction coefficient becomes smaller than the target value of 0.4, whereby the abrasion resistance deteriorates abruptly. If the content exceeds 5 percent by volume, the friction coefficient loses its stability although the same is in excess of 0.4, while attack against a clutch counter material is so extremely increased that the object of the present invention cannot be attained.

The friction/abrasion conditioner made of aluminum oxide and/or magnesium oxide in the present invention has preferably a maximum grain size of not more than 250 $\mu$m. If the grain size exceeds 250 $\mu$m, abrasion loss of the friction member and attack against the counter material are abruptly increased whereby the stability of the friction coefficient deteriorates.

The composite material of the invention further contains 30 to 40 percent by volume of an organic filler of not more than 840 $\mu$m in grain size. If the maximum grain size exceeds 840 $\mu$m, the organic filler cannot be homogenously mixed with other raw materials, whereby the friction/abrasion characteristic deteriorates.

A friction plate employed for an electromagnetic clutch is brought into pressure contact with an opposite driven power transmission member such as an armature for transmitting power by friction force in the pressure contact surface between the plate and the armature while cutting off power transmission by releasing the pressure contact of these members. The compression characteristic of the friction plate is important to make such an operation smooth, and experiences show that the optimum compression distortion factor per unit load (kg/cm$^2$) is larger than 0.1%. Thus, the organic filler is preferably made of cork powder and/or cashew dust. The compression distortion factor can be adjusted to be at least 0.1% with the content of cork powder and/or cashew dust being at least 30 percent by volume. However, if the content of cork powder and/or cashew dust exceeds 40 percent by volume, the friction/abrasion characteristic becomes undesirably unstable although the compression distortion factor exceeds 0.1%.

The inorgnic filler employed in the present invention can be a generally used filler, such as calcium carbonate.

Further, the porosity of the friction material composite according to the present invention must be 15 to 30 percent by volume. If the porosity is smaller than 15 percent by volume, the compression distortion factor of the friction member is reduced and the friction coefficient in the initial state is lowered, whereby the surface of the friction plate becomes extremely irregular in color so that the product quality deteriorates. If the porosity exceeds 30 percent by volume, the compression distortion factor of the friction member is increased to improve the friction coefficient in the initial state, however, the mechanical strength of the friction member is lowered very substantially and the abrasion resistance deteriorates. Thus, the object of the present invention cannot be attained.

The friction material composite according to the present invention is preferably applicable to a friction member of an electromagnetic clutch, since the present composite is substantially equivalent in abrasion resistance to the conventional non-asbestos friction material based on aramid fiber. The present composite also has a high friction coefficient even at its initial service. Particularly the torque transmission ability of an electromagnetic clutch can be substantially improved by the present invention, as compared with a conventional friction member, and hence the present invention can be applied to an electromagnetic clutch for driving a business machine or an industrial machine, to reduce the size and weight thereof.

Mixed powder of the friction material composite according to the present invention is not flocculated as is the case for the conventional mixed powder. Rather the present material is in fluidity, whereby the same can be easily handled to reduce the manufacturing steps as compared with the conventional case. Further, the present friction material composite does not require high-priced aramid fiber, whereby the present material can be manufactured at a low cost.

These and other objects, features, aspects and advantages of the present invention will become more apparent from the following examples of the present invention when taken in conjunction with the accompanying drawings.

EXAMPLES

The present invention will now described in detail with reference to Examples.

Reinforcing fiber materials were prepared in the form of staple cellulose pulp, organic fillers were prepared in the form of cork powder, cashew dust and synthetic rubber, inorganic fillers were prepared in the form of calcium carbonate, friction/abrasion conditioners were prepared in the form of aluminum oxide, and magnesium oxide and thermosetting resin binders were prepared in the form of powder phenol resin to be blended in compounding ratios as shown in Table 1 and homogenously mixed by a mixer. Prescribed amounts of such mixtures were weighed, and then molded by a compression molding machine. The molding conditions were as follows:

surface pressure: 100 kg/cm$^2$
mold temperature: 165° C.
molding time: 4 minutes Thereafter the mixtures were subjected tq a heat treatment at 200° C. for 5 hours, and then the surfaces of the molded forms were polished to manufacture clutch facings. Porosity values of these clutch facings were measured by a quick porosity measuring method disclosed in Japanese Patent Laying-Open Gazette No. 161438/1986. Table 1 also shows the results.

Figure 3:
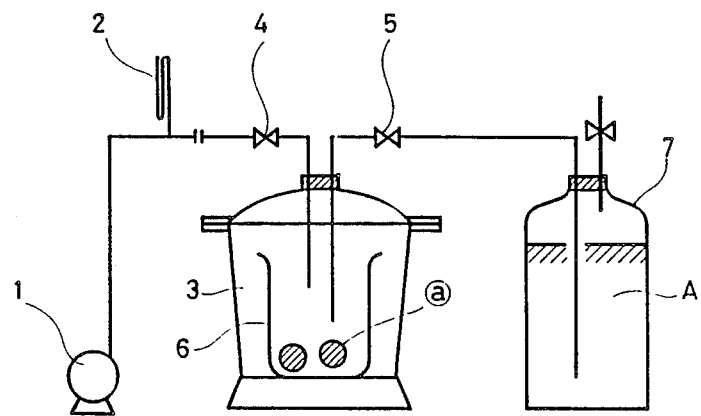
FIG. 3 is a schematic view showing an impregnation section of an apparatus for illustrating a quick porosity measuring method employed in the present invention.
Figure 4:
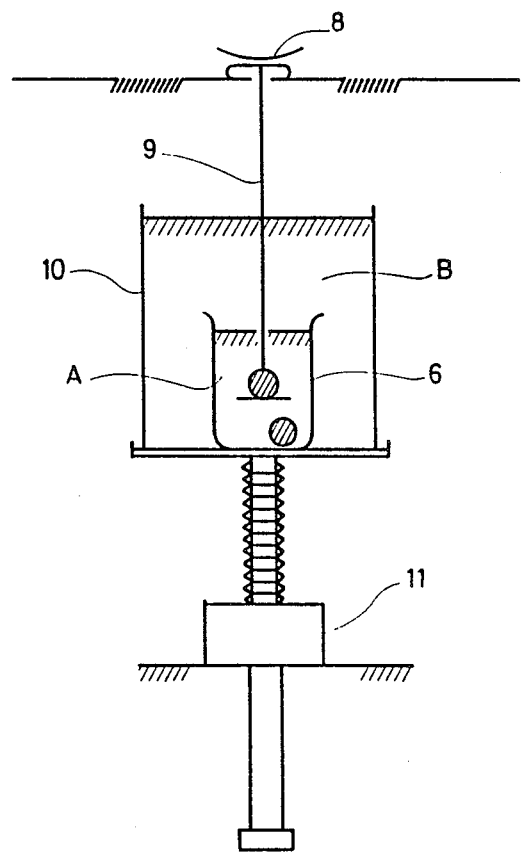
FIG. 4 is a schematic view showing a gravimetry section of the apparatus for illustrating the quick porosity measuring method employed in the present invention.

FIGS. 3 and 4 are schematic views for illustrating the aforementioned quick porosity measuring method.

Referring to FIGS. 3 and 4, a measuring apparatus comprises a vacuum pump 1, a manometer 2, a vacuum vessel 3, stop valves 4 and 5, a sample vessel 6, samples (a), an impregnant solution A, an impregnant solution storing vessel 7, an electronic balance 8, a suspender 9, a water vessel 10, a liquid sealing solution B, being incompatible with the impregnant solution A, and a lift 11.

Each sample (a) is sufficiently dried and the dead weight $W_A$ thereof is measured by the electronic balance 8. Thereafter the sample (a) is introduced into the vacuum vessel 3 while the stop valve 4 is opened and the stop valve 5 is closed to degass the vacuum vessel 3 by the vacuum pump 1, so that the reduced pressure in the vessel 3 is not more than 5 mmHg. Then the stop valve 4 is closed and the stop valve 5 is opened to inject the impregnant solution A. Thereafter the sample vessel 6 is dipped into the water vessel 10 as shown in FIG. 4 to be sealed by the sealing solution B, and left in this state until the impregnant solution A infiltrates into pores.

Then the sample (a) is placed on the suspender 9, to measure the weight $W_B$ thereof in the impregnant solution A. The water vessel 10 is lowered by the lift 11 to move only the suspender 9 into the sealing solution B thereby to zero-correct the weight thereof. Then the sample (a) is placed on the suspender 9, to measure the weight $W_C$ thereof in the sealing solution B.

Assuming that $D_A$ represents the density of the impregnant solution A and $D_B$ represents the density of the sealing solution B, the volume percent porosity P of the sample (a) is expressed as follows:

$$P = \frac{W_C - W_A + D_B/D_A \cdot (W_A - W_B)}{W_C - W_B} \times 100(\%)$$

In the simulation test, the impregnant solution A was prepared in the form of trichloro trifluoroethane, and the sealing solution B was water. Each sample (a) was prepared as a doughnut-shaped plate having an outer diameter of 99 mm, an inner diameter of 86 mm, and a thickness of 2 mm. The doughnut was divided into quarters to provide four sample members which were measured to average the result values.

The clutch facings of the invention are represented by Examples A to G. The examples of the invention and reference examples H to L and the prior art Example M were obtained in the aforementioned manner and tested in a simulation test using a thrust type friction/abrasion tester under test conditions as shown in Table 2. Table 3 shows the results of the simulation test.

TABLE 2

| Size of Friction Plate | 99 mm in outer diameter, 86 mm in inner diameter, 2 mm in thickness |
|---|---|
| Counter Material | carbon steel (120 mm, in outer diameter) |
| Effective Braking Radius | 0.046 m |
| Load | 100 kg (in manual torque measurement) |
| | 10 kg (in interruption) |
| Speed | 0 m/S (in manual torque measurement) |
| | 7.2 m/S (in interruption) |
| Interruption Cycle | ON for 3 sec. - OFF for 10 sec. |

TABLE 3

| | Example | | | | | | | Reference Example | | | | | Prior Art |
|---|---|---|---|---|---|---|---|---|---|---|---|---|---|
| | A | B | C | D | E | F | G | H | I | J | K | L | M |
| Initial $\mu_s{}^a$ | 0.56 | 0.54 | 0.54 | 0.54 | 0.58 | 0.59 | 0.61 | 0.55 | 0.39 | 0.56 | 0.53 | 0.62 | 0.36 |
| Initial $\mu_d{}^b$ | 0.53 | 0.47 | 0.48 | 0.49 | 0.54 | 0.54 | 0.58 | 0.51 | 0.36 | 0.51 | 0.49 | 0.59 | 0.33 |
| $\mu_s$ After Interruption $\mu_s{}^c$ | 0.48 | 0.51 | 0.52 | 0.49 | 0.44 | 0.46 | 0.46 | 0.60 | 0.50 | 0.50 | 0.46 | 0.47 | 0.42 |
| $\mu_d$ After Interruption | 0.46 | 0.48 | 0.49 | 0.47 | 0.43 | 0.45 | 0.45 | 0.54 | 0.46 | 0.48 | 0.45 | 0.46 | 0.40 |
| Abrasion Loss$^d$ | 0.045 | 0.071 | 0.047 | 0.042 | 0.055 | 0.042 | 0.038 | 0.141 | 0.132 | 0.040 | 0.125 | 0.037 | 0.040 |
| Attack Against Counter Material$^e$ | o | o | o | o | o | o | o | o | o | x | o | x | o |

$^a\mu_s$: coefficient of static friction
$^b\mu_d$: coefficient of dynamic friction
$^c$measured value after 100 interruptions (friction coefficient in stable state)
$^d$abrasion loss after 100 interruptions
$^e$o: moderate, x: heavy As may be seen from Table 3, each of the Examples A to G according to the present invention satisfies the condition that the friction coefficient in the initial state is higher than that in the stable state and exceeds 0.4 with no increase in attack against the counter material.

Figure 1:
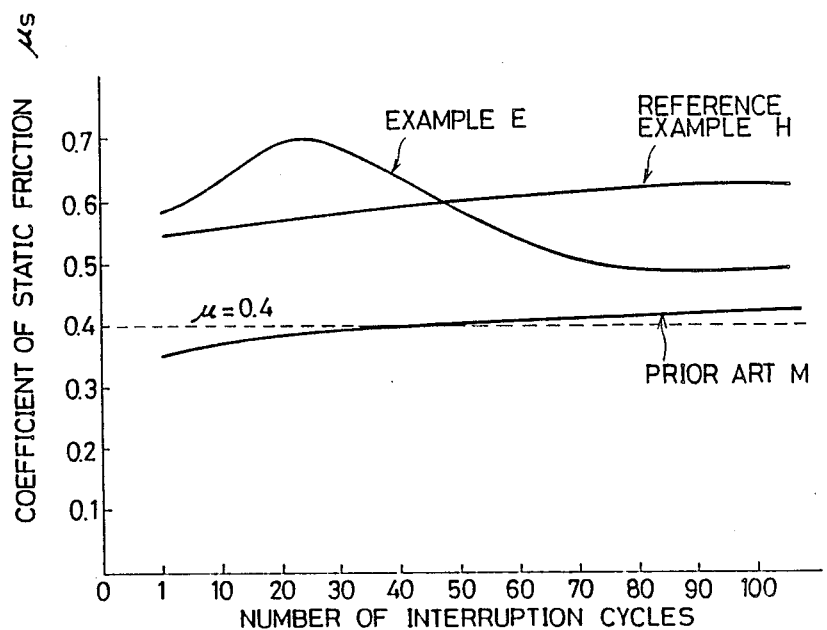
FIG. 1 illustrates the relationship between the static friction coefficient as a function of the number of interruption cycles applied in a simulation test of electromagnetic clutches.

FIG. 1 shows the static friction coefficient as a function of the number of interruption cycles in the simulation test with electromagnetic clutches equipped with Example E, reference example H and prior art M. As shown in FIG. 1, Example E has a constantly higher in static friction coefficient than the prior art Example M. Further, the static friction coefficient in the initial state of Example E is higher than that in the stable state, to satisfy the characteristic required for an electromagnetic clutch.

Figure 2:
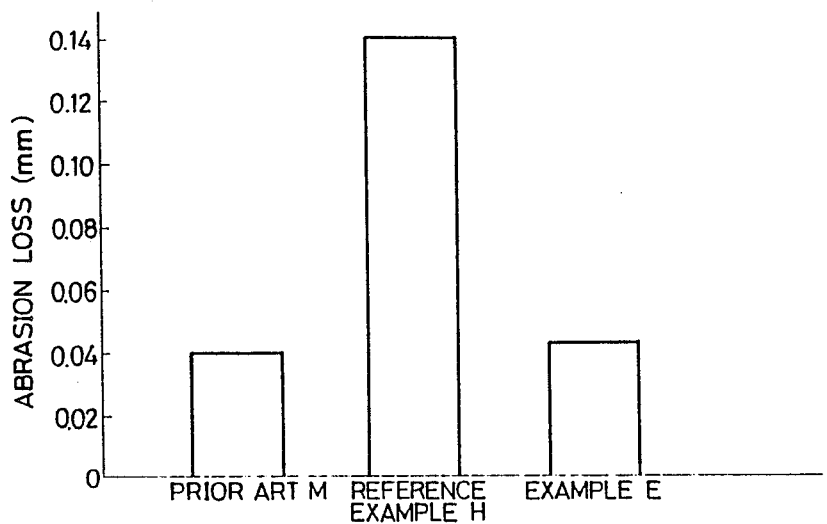
FIG. 2 illustrates the abrasion loss in the simulation test of the electromagnetic clutches.

FIG. 2 is a bar chart showing the abrasion loss in the simulation test of the electromagnetic clutches of Example E, reference example H and the prior art Example M. It is clearly understood from FIG. 2 that Example E according to the present invention has an excellent abrasion resistance similarly to the prior art Example M.

In order to study the influence of the porosity of friction material composites, clutch facings of different

TABLE 1

| | | | | | | | | | | | | | (vol. %) Prior Art |
|---|---|---|---|---|---|---|---|---|---|---|---|---|---|
| | Example | | | | | | | Reference Example | | | | | |
| | A | B | C | D | E | F | G | H | I | J | K | L | M |
| composition | | | | | | | | | | | | | |
| cellulose pulp | 30 | 30 | 30 | 30 | 30 | 30 | 30 | 30 | 30 | 30 | 30 | 30 | 5 |
| aromatic polyaramid fiber | — | — | — | — | — | — | — | — | — | — | — | — | 15 |
| cork powder | 17.5 | 35 | 35 | 35 | — | — | — | 17.5 | 35 | 35 | — | — | 10 |
| cashew dust | 17.5 | — | — | — | 35 | 35 | 35 | 17.5 | — | — | 35 | 35 | 10 |
| powder phenol resin | 10 | 10 | 10 | 10 | 10 | 10 | 10 | 10 | 10 | 10 | 10 | 10 | 25 |
| synthetic rubber | 5 | 5 | 5 | 5 | 5 | 5 | 5 | 5 | 5 | 5 | 5 | 5 | 20 |
| calcium carbonate | 18 | 19 | 18 | 15 | 19 | 18 | 15 | 20 | 19.7 | 13 | 19.7 | 13 | 8 |
| graphite | — | — | — | — | — | — | — | — | — | — | — | — | 5 |
| aluminum oxide | 1 | 1 | 2 | 5 | — | — | — | — | 0.3 | 7 | — | — | — |
| magnesium oxide | 1 | — | — | — | 1 | 2 | 5 | — | — | — | 0.3 | 7 | 2 |
| Total | 100 | 100 | 100 | 100 | 100 | 100 | 100 | 100 | 100 | 100 | 100 | 100 | 100 |
| porosity (vol. %) | 24 | 30 | 27 | 25 | 22 | 20 | 18 | 30 | 29 | 23 | 25 | 17 | 9 | porosity values were manufactured at the compounding ratio of Example D as shown in Table 1.

TABLE 4

|  | Example | | | Reference Example | |
| --- | --- | --- | --- | --- | --- |
|  | N | D | O | P | Q |
| Porosity (vol. %) | 15 | 25 | 30 | 10 | 35 |
| Initial $\mu_s{}^a$ | 0.52 | 0.54 | 0.56 | 0.50 | 0.61 |
| Initial $\mu_d{}^b$ | 0.47 | 0.49 | 0.52 | 0.43 | 0.57 |
| $\mu_s$ After Interruption$^c$ | 0.50 | 0.49 | 0.47 | 0.53 | 0.46 |
| $\mu_d$ After Interruption | 0.48 | 0.47 | 0.45 | 0.51 | 0.44 |
| Abrasion Loss$^d$ | 0.038 | 0.042 | 0.044 | 0.034 | 0.090 |
| Attack Against Counter Material$^e$ | o | o | o | o | o |
| Material Strength$^f$ | o | o | o | o | x |
| Appearence (Color Irregularity)$^g$ | o | o | o | x | o |

$^a$ to $^e$refer to Table 2
$^f$o: sufficient, x: insufficient
$^g$o: regular, x: irregular As shown by Table 4, the friction coefficient in the initial state was higher than that in the stable state in each of the Examples N, D and O, whose porosity values were within the range of 15 to 30 percent by volume according to the present invention, and was excellent in abrasion loss, attack against the counter material, material strength and appearance. On the other hand, the friction coefficient in the initial state was smaller than that in the stable state in reference example P having a porosity of 10 percent by volume, and the surface of the friction plate thereof was quite irregular in color with an inferior appearance. Reference example Q having a porosity of 35 percent by volume presented high a abrasion loss and an inferior material strength.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A friction material composite comprising the following components, a reinforcing fiber material, an organic filler, a friction and abrasion conditioner, and a thermosetting resin binder bonding said components together, wherein said reinforcing fiber material comprises 25 to 35 percent by volume of staple cellulose pulp of not more than 150 μm in fiber length, wherein said organic filler comprises 30 to 40 percent by volume of an organic filler of not more than 840 μm in maximum grain size, wherein said friction and abrasion conditioner comprises 0.5 to 5 percent by volume of aluminum oxide and/or magnesium oxide of not more than 250 μm in maximum grain size, said friction material composite further having a porosity of 15 to 30 percent by volume.

2. The friction material composite in accordance with claim 1, wherein
said organic filler contains cork powder.

3. The friction material composite in accordance with claim 1, wherein
said organic filler contains cashew dust.

4. The friction material composite in accordance with claim 1, wherein
said organic filler contains cork powder and cashew dust.

5. The friction material composite in accordance with claim 1, wherein
said thermosetting resin binder contains powder phenol resin.

6. The friction material composite in accordance with claim 1, wherein said components include an inorganic filler containing calcium carbonate.

7. The friction material composite of claim 1, in the form of a clutch lining having an initial friction coefficient of at least 0.4.

* * * * *